United States Patent [19]

Mercier et al.

[11] Patent Number: 4,931,541

[45] Date of Patent: Jun. 5, 1990

[54] THERMOSETTING QUINAZOLONE RESINS THEIR PREPARATION AND THEIR APPLICATIONS

[75] Inventors: Régis Mercier; Bernard Sillion, both of Lyon, France

[73] Assignee: Centre D'Etude Des Materiaux Organiques Pour Technologies Avancees, Solaize-Vernaison, France

[21] Appl. No.: 313,679

[22] Filed: Feb. 22, 1989

[30] Foreign Application Priority Data

Feb. 23, 1988 [FR] France ................. 88 02279

[51] Int. Cl.$^5$ .................. C08G 65/40; C08G 63/62; C08G 67/02; C08G 73/06
[52] U.S. Cl. .................. 528/370; 526/259; 526/285; 528/171; 528/172; 528/174; 528/211; 528/392; 528/423; 544/63; 544/283
[58] Field of Search ............ 528/171, 172, 174, 211, 528/370, 392, 423; 526/259, 285; 544/63, 283

[56] References Cited

U.S. PATENT DOCUMENTS 4,529,793  7/1985  Abe et al. ..................... 528/172
4,539,392  9/1985  Kadoi et al. .................. 528/172

*Primary Examiner*—Harold D. Anderson
*Assistant Examiner*—T. Mosley
*Attorney, Agent, or Firm*—Millen, White & Zelano

[57] ABSTRACT

Thermosetting quinazolone resins, their preparation and their applications are described.

These thermosetting quinazolone resins can be defined as having the following general formula:

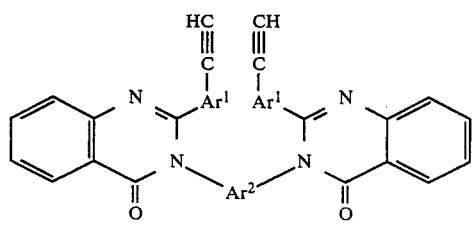

in which $Ar^1$ is a bivalent mono- or polycyclic aromatic radical and $Ar^2$ is a bivalent aromatic radical of several simple aromatic rings bound two by two by atoms or bivalent groups.

These $Ar^1$ and $Ar^2$ radicals are chosen so that the melting or emollescence temperature is between 80° C. and 170° C.

The resins can be prepared from condensation of an ethynylarylbenzoxazinone with an aromatic diamine containing flexibilizing groups.

These quinazolone resins can be polymerized in bulk in order to prepare adhesives or composite matrices in particular.

17 Claims, No Drawings

THERMOSETTING QUINAZOLONE RESINS THEIR PREPARATION AND THEIR APPLICATIONS

BACKGROUND OF THE INVENTION

The present invention relates to is organic resins or compounds resistant to temperature and polymerizing in bulk without evolution of volatile products.

Thermostable structures, their chemistry and their properties have been amply described in recent years (P. E. Cassidy, "Thermally Stable Polymers", Marcel Dekker, 1980, and J. P. Critchley, G. J. Knight, W. W. Wright, "Heat Resistant Polymers", Plenum Press 1983). These materials have applications in the industrial field in particular, such as electrotechnics, electronics, microelectronics or separation techniques. Thermoplastic thermostable polymers whose principal aromatic or heterocyclic chain is rendered more flexible by ether, sulfur, perfluoroisopropylidene or other bonds are singled out. These polymers can be used in solution or in bulk above the glass-transition temperature or above the melting temperature of their use as adhesives or composite matrices, for example.

Under these conditions, high pressures have to be applied and the thermal content of the material is limited by glass or crystalline transitions.

The second class of polymers investigated for structural applications is that of thermosetting polymers. Some are linear. They are used in the form of functional oligomers of low molecular weight and polycondensation is carried out under production conditions. This is the case for polybenzhydrolimides, described notably in FR-A-1 601 091 patent. The disadvantage with these resins is the evolution of volatile products during polycondensation.

This disadvantage is also encountered with PMR resins ("polymerization of monomeric reactants"), in particular those marketed under the name of PMR 15. These are mixtures obtained by condensation of a methyl diester of tetracarboxylic benzophenone acid, the methyl monoester of nadic acid and an aromatic diamine, such as 4,4-diamino diphenylmethane. The proportions of reactants are calculated such that the theoretical molecular weight of the product is about 1500 and so that all molecules end with nadic groups at each end. At the moment of implementation, condensation and imidation reactions are produced, then at the highest temperature (270° C.), polymerization of reactive ends occurs, leading to reticulation of the system (T. T. Serafini, P. Delvigs, G. R. Lightsey, J. Appl. Polym. Sci., 16, 905, 1972).

These reactants are unstable at room temperature and are difficult to implement. This evolution towards thermostable thermosetting systems thus presents at least two considerable problems: the choice of chaining between the reactive functions and the choice of the two reactive end functions. Chaining between the reactive functions should not lead to evolution of volatile products during use and, consequently, must be completely condensed and/or cyclized. Furthermore, it is the nature of this chaining that will fix the emollescence point of the resin before reaction, as well as the glass-transition point of the network before reticulation.

Concerning the two reactive functions, three main groups can be distinguished: maleimide, nadimide and acetylene functions.

Acetylene functions polymerize at low temperatures: very slowly as from 150° C. and rapidly at 200° C.

Polymerization of maleimides greatly depends on the environment and three types of polycondensation are identified: polymerization by nucleophilic addition (Michael addition), radical polymerization, anionic polymerization. It is difficult to control implementation reactions and, when considering polycondensation by addition of a diamine, the presence of a free amine in the resin renders this type of material or questionable valve in view of legislation concerning toxicity. Polymerization of nadic groups involves a Diels-Adler retro reaction which liberates a maleimide function and a cyclopentadiene molecule. Production of this type of resin thus requires a delicate choice of temperature and pressure to be made so that the volatile diene is incorporated into the material by polymerization.

It is thus not surprising to find, for new thermostable resins, the choice of the reactive function oriented towards ethylene resins, despite a certain amount of difficulty in synthesis in introducing the acetylene function in the molecule. The resin Thermid 600 (marketed by National Starch) is an example of an oligoimide (or isoimide) ending in an ethylene function at each end. Nontheless, it must be noted that these resins melt at a temperature higher than the temperature at which polymerization of acetylenes begins. This is rather inconvenient as it would be difficult to wet the support, satisfactorialy without passing through the melted state.

The same is true for most quinoxaline resins ending in acetylene groups studied by NASA and called ATQ (U.S. Ser. No. 518,897 patent application or R. F. Kovar, G. F. L. Ehlers, F. E. Arnold, Poly. Prep. Am. Chem. Soc. Div. Polym. Chem. 16 (2) 246 1975).

This is, generally speaking, the disadvantage with most heterocyclic resins, which are intrinsically rigid. We have tried to overcome this difficulty by abandoning heterocyclic chaining in favor of ether sulfone type chainings. The resins obtained, called ATS, allow a fusible stage before reticulation of terminal acetylene groups (U.S. Pat. No. 4 131 625 patent and R. F. Kovar, G. F. L. Ehlers, F. E. Arnold, J. Poly. Sci., Polym. Chem. Ed. 15, 1981, 1977). On the other hand, the glass-transition temperature of the reticulated network is often low.

SUMMARY OF THE INVENTION

It has now been discovered that some heterocyclic quinazolones allow us to obtain acetylene resins having melting or emollescence temperatures low enough for acetylene polymerization to begin in the melted state. Further, these resins, after reticulation, have a glass-transition point that is high enough for applications at high temperatures. The aim of the present invention is to describe these resins, the process for their manufacture and their bulk polymerization reaction.

In a general manner, the resins of the invention can be defined as having the general formula:

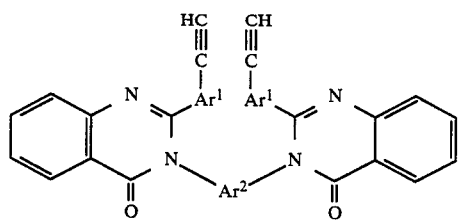

in which Ar$^1$ is a bivalent mono- or polycyclic aromatic radical comprising 6 to 20 carbon atoms; when Ar$^1$ comprises several aromatic rings, these can be joined or bound together by a simple bond or via the intermediary of an atom or bivalent group such as:

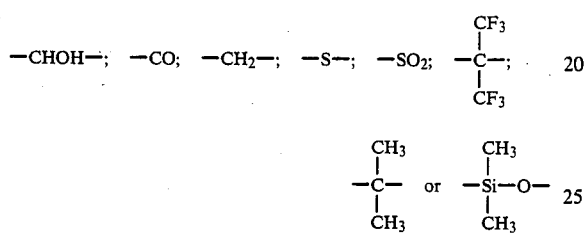

The aromatic ring(s) of the Ar$^1$ radical may be nonsubstituted or substituted by at least one alkyl group of 1 to 3 carbon atoms, preferably a methyl group.

Within the scope of the present invention, the Ar$^1$ group can be a phenylene radical whose two valencies are preferably in the meta position. Among the naphthalene radicals, we prefer those whose valencies are in position 1,4; 1,5; 2,5 or 2,6. The following in particular can be cited among Ar$^1$ radicals comprising two phenylene cores: diphenylether, diphenylsulfide and 2,2'-diphenyl perfluoropropane radicals, whose valencies available for fixation onto the quinazolone core and the acetylene function are preferably in position 4,4' and 4,3'.

Ar$^2$ is a bivalent carbocyclic or heterocyclic aromatic radical containing 12 to 30 carbon atoms and consisting of at least two simple aromatic rings bound two by two by atoms or bivalent groups, for example, bivalent aliphatic or perfluoro-aliphatic groups or bivalent heteroatoms or heteroatomic groups such as:

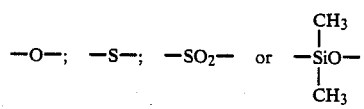

Within the scope of the invention, bisphenoxyphenylsulfone and bisphenoxypyridine can be advantageously cited. Choice of the Ar$^1$ and Ar$^2$ radicals is made so that the melting or emollescence temperature of the resin is preferably from 80° C. to 170° C. In order to achieve this objective, flexible groups can be introduced into the Ar$^1$ radical or the Ar$^2$ radical.

The resins of the invention can be prepared using various reaction sequences. However, we prefer to use the following diagram: a benzoxazinone containing the acetylene function is prepared according to equations 1 and 2:

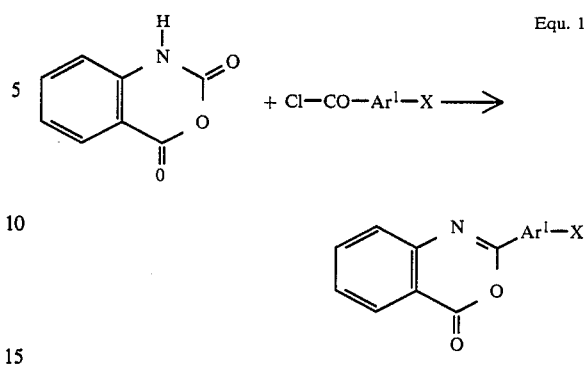

Equ. 1

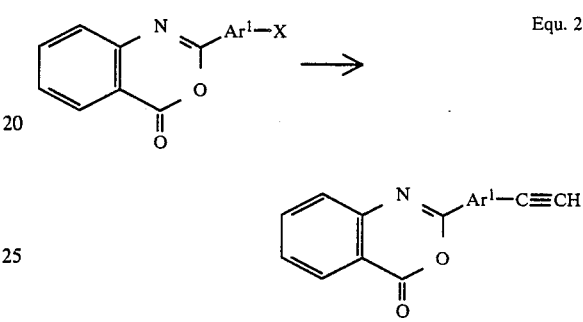

Equ. 2

According to equation 1, a chloride of a halogenated aromatic acid (X is a halogen, preferably bromine or iodine) reacts with isatoic anhydride to give the halogenated benzoxazinone which is ethynylated according to a known process, according to equation 2.

The ethynylated benzoxazinone is then condensed on a biprimary diamine at a proportion of about two moles of ethynylated benzoxazinone per mole of diamine.

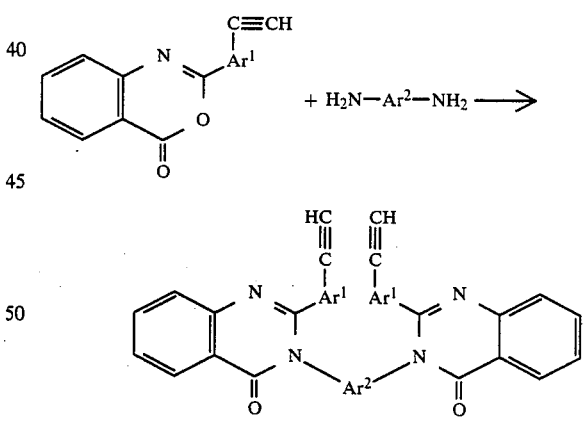

The latter reaction can be carried out in a phenolic solvent or in pyridine in the presence of triphenylphosphite.

The quinazolone resins of the invention, which contain two acetylene functions fixed on quinazolone functions bound together by aromatic or heterocyclic groups and flexibilizing bridges, are present in the form of amorphous materials whose emollescence temperature is between 80° C. and 170° C. This characteristic allows polymerization of acetylenes in the condensed state in a near liquid form, allowing good wetting of surfaces, a condition necessary for resins to show good adhesive properties.

Polymerization of these resins is carried out by straightforward heating at a temperature between 180° C. and 250° C.

After polymerization, thermal stability is very good as the resin loses only 5% of its initial weight at a temperature greater than 450° C. under air.

The glass-transition temperature, determined by thermomechanical analysis, is greater than 280° C., which allows application at high temperatures without alteration of mechanical properties. These resins have applications in electronics for preparation of conducting or insulating thermostable glues and in the field of structural materials for preparation of composite matrices.

The following examples illustrate the invention without in any way limiting it:

EXAMPLE 1

Preparation of 2-[4-(trimethylsilylethynyl)phenyl] 4(H) 1,3-benzoxazin-4-one (compound A)

6.04 g (0.02 mole) of 2-(4-bromophenyl) 4(H) 1,3-benzoxazin-4-one are dissolved in a solvent mixture composed of 80 cc of THF and 20 cc of triethylamine. The solution is heated at a temperature of 70° C. 0.025 g of palladium acetate and 0.05 g of triphenylphosphine are then added, which produces a yellowish coloration of the reaction medium. 2.45 g (0.025 mole) of trimethylsilylacetylene are added drop by drop. The reaction is left to proceed for eight hours. Triethylamine hydrobromate is then filtered before evaporation of solvents under vacuum. The amorphous brown solid recovered is recrystallized in petroleum ether. Yield of the reaction is 65%.

EXAMPLE 2

Synthesis of a bis-acetylene quinazolone (resin B) from 2,6-bis-(3-aminophenoxy)pyridine (compound B)

8.85 g (0.027 mole) of compound A and 3.87 g (0.0132 mole) of compound B are dissolved in 20 cc of pyridine. 4.5 g of triphenylphosphite are then added. The mixture is heated at 100° C. and maintained at this temperature for 10 hours. At the end of the reaction, pyridine is evaporated under vacuum. The raw product obtained is dissolved in methanol. On addition of this solution to water, a white precipitate is obtained which is filtered and dried under vacuum. The raw product is recrystallized in hexane. The protecting group (trimethylsilyl) is then eliminated by treating the quinazolone in methanol with $K_2CO_3$ for one hour at 25° C. Overall yield is 75%.

EXAMPLE 3

Synthesis of a bis-acetylene quinazolone (resin C) from 2,2-bis-(4-(4-aminophenoxy)phenyl)propane (compound C)

The synthesis process is identical to that described in the previous example. The raw product obtained is recrystallized in a hexane-ethyl acetate mixture. Elimination of the protecting group is carried out in a methanol-benzene solvent mixture in the presence of $K_2CO_3$ at 25° C. Overall yield is 65%.

EXAMPLE 4

Synthesis of a bis-acetylene quinazolone (resin D) from bis-(4-(4-aminophenoxy)phenyl)sulfone (compound D)

Synthesis conditions are identical to those described in example 2 and 3. Recrystallization of the product is carried out in a hexane-ethyl acetate mixture. The protecting group (trimethylsilyl) is eliminated using the method described in example 3. Overall yield is 62%.

EXAMPLE 5

Polymerization of a bis-acetylene quinazolone resin

The resin presented in example 4 can be submitted to a calcination cycle under argon, composed of three steps: 30 minutes at 175° C., 120 minutes at 240° C. and 60 minutes at 310° C. Under these conditions, the polymerized resin has a glass-transition temperature of 325° C. With the same calcination cycle, thermodegradation of the polymerized resin under air gives the following results:

| Loss of weight | 1% | 5% | 10% |
|---|---|---|---|
| T °C. | 435 | 484 | 525 |

EXAMPLE 6

Comparative table of glass-transition temperatures before and after polymerization of the resins presented in examples 2, 3, 4.

| RESIN | Tg before calcination | Tg after calcination* |
|---|---|---|
| B | 85 | 290 |
| C | 164 | 345 |
| D | 157 | 325 |

*Polymerization cycle under argon:
2 hours at 230° C.
1 hour at 320° C.

What is claimed is:

1. Thermosetting quinazolone compound of the formula:

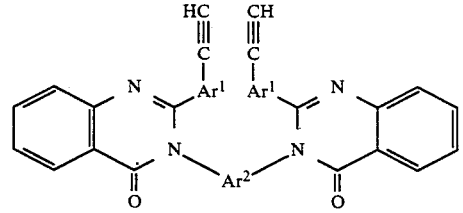

in which $Ar^1$ is a bivalent mono- or polycyclic aromatic radical of 6 to 20 carbon atoms, nonsubstituted or substituted by at least one alkyl group of 1 to 3 carbon atoms, $Ar^2$ is a bivalent carbocyclic or heterocyclic aromatic radical of 12 to 30 carbon atoms comprising at least two simple aromatic rings bound two by two by bivalent atoms or groups.

2. Thermosetting quinazolone compound according to claim 1 having a melting or emollescence temperature from 80° C. to 170° C.

3. Thermosetting quinazolone compound according to claim 1 wherein the $Ar^1$ radical comprises several aromatic rings joined or bound together by a simple bond or an atom or a bivalent group.

4. Thermosetting quinazolone compound according to claim 3 wherein the $Ar^1$ radical is a metaphenylene radical, a 1,4, 1,5, 2,5 or 2,6 naphthalene radical, a 4,4' (or 4,3') diphenylether, diphenylsulfide or 2,2-diphenylperfluoropropane radical.

5. Thermosetting quinazolone compound according to claim 1 wherein the $Ar^2$ radical is a bis-phenoxyphenylsulfone or bis-phenoxypyridine radical.

6. Process for preparation of a thermosetting quinazolone compound according to claim 1 wherein:

(a) a chloride of a halogenated aromatic acid of formula $Cl-CO-Ar^1X$ in which X is a halogen atom reacted with isatoic anhydride to give the halogenated benzoxazinone corresponding to the formula

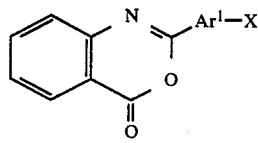

(b) said halogenated benzoxazinone is reacted with an ethynylation agent to form an ethynylated benzoxazinone of the formula

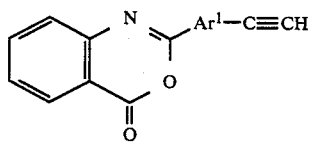

and (c) said ethynylated benzoxazinone is condensed with a biprimary aromatic diamine of the formula $H_2N-Ar^2-NH_2$ in a proportion of about 2 moles of ethynylated benzoxazinone per mole of diamine to yield said thermosetting quinazolone compound of claim 1.

7. An article of manufacture formed by hardening a thermosetting quinazolone compound according to claim 1 by heating at a temperature from 180° to 250° C.

8. A thermosetting quinazolone compound according to claim 2 wherein the $Ar^1$ radical comprises several aromatic rings joined or bound together by a simple bond or an atom or a bivalent group.

9. A thermosetting quinazolone compound according to claim 2 wherein the $Ar^2$ radical is a bis-phenoxyphenylsulfone or bis-phenoxypyridine radical.

10. A thermosetting quinazolone compound according to claim 3 wherein the $Ar^2$ radical is a bis-phenoxyphenylsulfone or bis-phenoxypyridine radical.

11. A thermosetting quinazolone compound according to claim 4 wherein the $Ar^2$ radical is a bis-phenoxyphenylsulfone or bis-phenoxypyridine radical.

12. A compound according to claim 1, wherein $Ar^1$ is phenylene and $Ar^2$ is bis-phenoxypyridine.

13. A compound according to claim 1, wherein $Ar^1$ is phenylene and $Ar^2$ is bis-phenoxyphenylpropane.

14. A compound according to claim 1, wherein $Ar^1$ is phenylene and $Ar^2$ is bis-phenoxyphenylsulfone.

15. An article of manufacture formed by hardening a thermosetting quinazolone compound according to claim 12 by heating at a temperature from 180° to 250° C.

16. An article of manufacture formed by hardening a thermosetting quinazolone compound according to claim 13 by heating at a temperature from 180° to 250° C.

17. An article of manufacture formed by hardening a thermosetting quinazolone compound according to claim 14 by heating at a temperature from 180° to 250° C.

* * * * *